3,179,645
PROCESS OF PRODUCING POLYVINYL ALCOHOL OF IMPROVED PROPERTIES

Kiyokazu Imai, Kurashiki, Japan, assignor to Kurashiki Rayon Co., Ltd., Kurashiki-shi, Japan, a corporation of Japan
No Drawing. Filed May 22, 1961, Ser. No. 111,435
Claims priority, application Japan, May 25, 1960, 35/25,284
2 Claims. (Cl. 260—91.3)

The present invention relates to polyvinyl alcohol and to shaped objects of polyvinyl alcohol, such as polyvinyl alcohol films, fibers and the like, and the invention is more particularly concerned with polyvinyl alcohol which can be formed into films, fibers and other shaped articles having a desired low degree of swelling in water.

Polyvinyl alcohol is a polymer containing hydroxyl groups and corresponding to the formula:

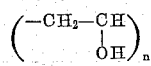

wherein $n$ is an integer which can vary within wide limits, as is well-known in the art. Polyvinyl alcohol can be produced from the corresponding polyvinyl ester by alkaline or acid saponification or re-esterification, i.e. alcoholysis, in accordance with the following equation:

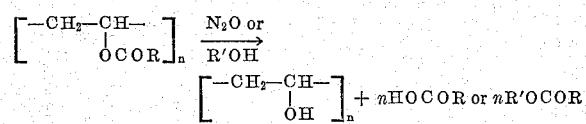

Heretofore, polyvinyl alcohols have generally been produced by the saponification of polyvinyl acetate, although occasionally they have been derived from polyvinyl formate. In other words, commercial polyvinyl alcohol films, fibers and like shaped products have been formed from polyvinyl alcohols derived from the vinyl ester homopolymers polyvinyl acetate or polyvinyl formate. It has been understood in the art that even though these different polyvinyl esters have been employed as the raw materials, the produced polyvinyl alcohols would have similar properties and that the films, fibers and the like formed from these polyvinyl alcohols would not differ from each other in their properties. In general, polyvinyl alcohols derived from these homopolymers are water sensitive and fibers, films, and other objects formed from them have a strong tendency to swell in water. Various special treatments have therefore been proposed to render these products more resistant to swelling, e.g. heat-treatment.

It is an object of this invention to provide means for obtaining polyvinyl alcohol which can be formed into shaped articles having low degrees of swelling in water.

It is another object of the invention to provide polyvinyl alcohol having improved characteristics with respect to resistance to water.

In accordance with the invention, polyvinyl alcohol is produced by the saponification of vinyl ester copolymers, more particularly the copolymer of vinyl acetate and vinyl propionate and the copolymer of vinyl acetate and vinyl butyrate.

I have made the discovery that, contrary to prior knowledge, the nature of the vinyl ester polymer used as the raw material for polyvinyl alcohol production does have a bearing upon the properties of the resulting polyvinyl alcohol when the polymer is a lower alkyl vinyl ester copolymer, particularly the properties relating to the crystallinity of polyvinyl alcohol. By the use of such copolymers as raw materials, the crystallizability of polyvinyl alcohol can be considerably improved, thereby causing a significant reduction in the degree of swelling of films, fibers and like products formed from the polyvinyl alcohol.

It is well-known that the degree of swelling of films, fibers and the like formed from polyvinyl alcohol can be markedly reduced by heat-treatment, and heat-treatment is industrially utilized in practice. Since the degrees of swelling of polyvinyl alcohol films, fibers and the like can be reduced through heat-treatment, it would not seem to be of significance to use highly crystalline polyvinyl alcohols such as can be produced in accordance with this invention for the manufacture of the films, fibers and other shaped products. This reduction in the degree of swelling, however, is highly significant.

For example, when films of polyvinyl alcohols derived from polyvinyl acetate and from the vinyl ester copolymers of this invention under given conditions are subjected to test to determine the degree of swelling in water at 30° C., the film made from the vinyl ester copolymers has a much lower degree of swelling. When these films are heat-treated at 180° C. for 15 minutes, their respective water-resisting properties are improved and their degrees of swelling in water at 30° C. are reduced nearly to the same value. When, however, this determination of the degree of swelling is carried out at a higher temperature of 80° C., for instance, a large difference appears between the degrees of swelling of the two films referred to above, although no significant difference is observed at 30° C. Namely, the film made from polyvinyl acetate shows a high degree of swelling, whereas that from the vinyl ester copolymer exhibits a low degree of swelling.

The invention will be further understood from the following specific examples of practical application. However, it will be understood that these examples are not to be construed as limiting the scope of the present invention in any manner. In these examples, all parts are by weight, unless otherwise indicated.

EXAMPLE 1

A mixture of vinyl acetate and vinyl propionate was polymerized using 2,2-azo-bis-isobutylonitrile as a catalyst in a closed tube at 60° C. for 9 hours. There were thus produced vinyl acetate-vinyl propionate copolymers. Each copolymer sample was dissolved in methanol in a concentration of 5%. Two parts of the resulting solution were mixed with 1 part by volume of a 1 N-solution of methanolic caustic soda and the solution was maintained at 50° C. for 2 hours to saponify the polyvinyl copolymer. The polyvinyl alcohol obtained was further treated in conventional manner to reduce the residual ester groups. Subsequently, the polyvinyl alcohol thus produced was digested in a relatively large volume of a solution comprising acetic acid (1 part by volume) and methanol (4 parts by volume) so that the sodium propionate and sodium acetate produced as by-products would be converted to the corresponding free acid. Finally, by Soxhlet-extracting the polyvinyl alcohol with methanol, refined polyvinyl alcohol was obtained. A portion of this polyvinyl alcohol was fractionated by the use of water as a solvent and n-propyl alcohol as a precipitant. The unfractionated and fractionated polyvinyl alcohol samples were then subjected to test to determine the time needed to cause a solution of the polyvinyl alcohol in water containing 6% dimethylsulfoxide to become turbid. It has been observed that for polyvinyl alcohols of the same degree of polymerization, the above-mentioned time for turbidity is closely related to the crystallinity of the polyvinyl alcohols. The shorter the time for turbidity, the greater the crystallinity, or the property of crystallizability, of the polyvinyl alcohol (Chemistry of High Polymers, Japan, 16, 499, (1959)). As the result of these determinations, it was ascertained that the time required for turbidity of these polyvinyl alcohols is about ¼–⅙ that of polyvinyl alcohol derived from polyvinyl acetate having the same degree of polymerization obtained by polymerization in ethyl acetate solution at 60° C.

Furthermore, films of the several polyvinyl alcohol samples were produced in conventional manner and the degree of swelling of the films in water at 30° C. was determined. It was found that the films of polyvinyl alcohol obtained from the copolymer produced by the copolymerization of vinyl propionate and vinyl acetate had a degree of swelling of the order of 1.97–2.45, although these values can be varied depending on the degree of polymerization, whereas the degree of swelling of the films obtained from polyvinyl alcohol derived from the homopolymer of vinyl acetate at 60° C. was 2.6. The pertinent data relating to the foregoing tests with polyvinyl alcohols derived from the lower alkyl vinyl ester copolymers of this invention are set forth in the following table.

With respect to known saponification processes and techniques, reference is suitably made, for example, to Bristol U.S. Patent 2,700,035, Waugh et al. U.S. Patent 2,642,419 and Germain U.S. Patent 2,643,994.

In like manner the polyvinyl alcohol is formed into fibers, films, and other shaped forms by following conventional practice. The spinning of polyvinyl alcohol to form fibers, particularly the so-called "wet-spinning" technique is described, for example, in the above-mentioned Cline et al. U.S. Patent 2,610,360 and in Osugi et al. Patent No. 2,906,594. An especially preferred spinning technique is described in copending application Serial No. 336,166 of Tomonari et al., filed February 10, 1953.

In any case, conventional dry-spinning or wet-spinning operations are employed in producing the fibers and subsequent heat-treatment, stretching and relaxation are

*Table 1*

| Composition of stock-solution, mol percent of vinyl propionate | 2,2'-azobis-isobutylo-nitrile (percent) | Time of polymerization (hours) | Polymer conversion (percent) | Intrinsic viscosity of polyvinyl ester (dl./g.) | Composition of the polymer, mol percent of vinyl propionate | Degree of polymerization, $P_A$, of polyvinyl alcohol | Time for turbidity $t_{1/2}$ (hrs.) | Degree of swelling in water at 30° C. |
|---|---|---|---|---|---|---|---|---|
| 75 | 0.0088 | 9 | 58.4 | 0.687 | 79.9 | 415 | 31.5 | |
| 50 | 0.0075 | 9 | 51.3 | 0.523 | 53.2 | 563 | 33.0 | 1.97 |
| 25 | 0.0063 | 9 | 45.9 | 0.883 | 30.4 | 960 | 33.2 | 2.45 |

EXAMPLE 2

In accordance with the method described in Example 1, a copolymer of vinyl butyrate with vinyl acetate was produced and the resulting polyvinyl ester was converted to polyvinyl alcohol, as in Example 1. Both the time for turbidity and the degree of swelling were determined. The conditions of polymerization and the results of the determinations are tabulated in Table 2.

effected using known techniques as described, for example, in said patents.

Similarly, films and other shaped forms of polyvinyl alcohol are suitably produced in conventional manner as described, for example, in Schnabel U.S. Patent 2,177,612 and in U.S. Patents 2,236,061 and 2,837,770.

The fibers, films, or other shaped objects producible from the polyvinyl alcohol may be acetalized in accord-

*Table 2*

| Composition of stock-solution, mol percent of vinyl butyrate | 2,2'-azobis-isobutylo-nitrile (percent) | Time of polymerization (hours) | Polymer conversion (percent) | Intrinsic viscosity of polyvinyl ester (dl./g.) | Composition of the polymer, mol percent of vinyl butyrate | Degree of polymerization, $P_A$, of polyvinyl alcohol | Time for turbidity $t_{1/2}$ (hrs.) | Degree of swelling in water at 30° C. |
|---|---|---|---|---|---|---|---|---|
| 75 | 0.0088 | 10 | 69.8 | 0.762 | 76.7 | 540 | 23.7 | |
| 50 | 0.0075 | 10 | 57.9 | 0.833 | 53.5 | 746 | 27.0 | 2.20 |
| 25 | 0.0063 | 10 | 50.0 | 1.159 | 28.2 | 1260 | 33.0 | 2.49 |

The time for turbidity of these polyvinyl alcohols is considerably lower in comparison with that of polyvinyl alcohol obtainable from the homopolymer of vinyl acetate. Furthermore, the degrees of swelling of these polyvinyl alcohols are below 2.5. This value is also considerably lower than the degree of swelling of polyvinyl alcohol derived from polymers produced by the homopolymerization of vinyl acetate.

The conditions and relative relationships set forth in the examples are those preferred but it will be understood that other conditions and relationships may be used within the scope of the invention. For example, the ratio of 25 to 75 mol percent with respect to the proportion of vinyl proprionate or vinyl butyrate in the monomer mixture with vinyl acetate, is preferred. In general, unless otherwise indicated, conventional operations and techniques are suitably employed. For example, the polymerization catalyst employed may be any of the conventional catalyst used in the polymerization of vinyl esters, e.g. vinyl acetate, such as azonitriles or peroxides, but the use of azonitriles is preferred. Thus, conventional vinyl ester polymerization techniques, catalysts and polymerization apparatus are employed and suitable polymerization catalysts, vessels and techniques are described, for example, in Cline et al. U.S. Patent 2,610,360. Conventional techniques and operations are also employed in the conversion of the vinyl copolymers into polyvinyl alcohol.

ance with conventional practice in this art as described, for example, in the above-mentioned Osugi et al. Patent 2,906,594 and in Cline et al. Patents 2,636,803 and 2,749,208.

The polyvinyl alcohol obtained by the conventional saponification of vinyl ester copolymers produced in accordance with this invention is characterized by crystallinity as determined by conventional infrared spectroscopic techniques applied, for example, to films or fibers of the polyvinyl alcohol, and by a degree of swelling in water of less than 1.5, as measured upon a film of the polyvinyl alcohol of, for example, a thickness of 0.2 mm. The degree of swelling in water is measured by standard tests designed to determine this property, at specified temperatures, e.g. at 30° C. and at 85° C., the film being immersed in water at the specified temperature for a predetermined period of time, e.g. 24 hours.

It will also be understood that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

I claim:

1. The process of producing polyvinyl alcohol having a degree of swelling in water at 30° C. of less than 2.5, which comprises preparing said polyvinyl alcohol by saponifying in a saponification medium in the presence of a saponification catalyst a copolymer of a monomer mixture consisting of vinyl acetate and 25 to 75 mol percent based on said monomer mixture of a vinyl ester selected from the group consisting of vinyl propionate and vinyl butyrate.

2. The process of producing polyvinyl alcohol of improved characteristics and having a degree of swelling in water at 30° C. of less than 2.5, which comprises copolymerizing a monomer mixture consisting of vinyl acetate and 25 to 75 mol percent based on said monomer mixture of a vinyl ester selected from the group consisting of vinyl propionate and vinyl butyrate, and saponifying the resultant copolymer in a saponification medium in the presence of a saponification catalyst to form said polyvinyl alcohol.

References Cited by the Examiner
UNITED STATES PATENTS

| | | | |
|---|---|---|---|
| 1,672,156 | 6/28 | Hermann et al. | 260—91.3 |
| 2,227,997 | 1/41 | Berg | 260—91.3 |
| 2,399,653 | 5/46 | Roland | 260—91.3 |

WILLIAM H. SHORT, *Primary Examiner.*
P. E. MANGAN, *Examiner.*